United States Patent
Shinkai et al.

(10) Patent No.: US 9,732,845 B2
(45) Date of Patent: Aug. 15, 2017

(54) SHIFT RANGE SWITCHING DEVICE FOR VEHICLE

(71) Applicant: Nidec Tosok Corporation, Zama-shi, Kanagawa (JP)

(72) Inventors: Kazumi Shinkai, Zama (JP); Shuichi Kinjo, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 15/166,396

(22) Filed: May 27, 2016

(65) Prior Publication Data

US 2016/0348783 A1     Dec. 1, 2016

(30) Foreign Application Priority Data

May 29, 2015  (JP) ................................ 2015-110325

(51) Int. Cl.
| | |
|---|---|
| *F16H 1/32* | (2006.01) |
| *F16H 59/08* | (2006.01) |
| *F16H 61/32* | (2006.01) |
| *H02K 7/116* | (2006.01) |
| *F16H 61/28* | (2006.01) |

(52) U.S. Cl.
CPC ............. *F16H 59/08* (2013.01); *F16H 1/32* (2013.01); *F16H 61/32* (2013.01); *H02K 7/116* (2013.01); *F16H 2001/325* (2013.01); *F16H 2059/081* (2013.01); *F16H 2061/2892* (2013.01); *F16H 2061/326* (2013.01)

(58) Field of Classification Search
None
See application file for complete search history.

(56) References Cited

U.S. PATENT DOCUMENTS

| | | | | |
|---|---|---|---|---|
| 1,715,778 | A | * 6/1929 | Orr | ........................... F16H 1/32 |
| | | | | 475/171 |
| 3,217,566 | A | * 11/1965 | Sanson | ..................... F16H 1/24 |
| | | | | 475/175 |
| 3,424,036 | A | 1/1969 | Colgan | |

(Continued)

FOREIGN PATENT DOCUMENTS

| | | |
|---|---|---|
| JP | 2004-044685 A | 2/2004 |
| JP | 2009-065742 A | 3/2009 |

(Continued)

*Primary Examiner* — Dirk Wright
(74) *Attorney, Agent, or Firm* — Keating & Bennett, LLP

(57) ABSTRACT

A shift range switching device of a vehicle includes a fixing member provided in a vicinity of an external-toothed gear, an electric motor, an eccentric shaft provided on an output shaft, the external-toothed gear rotatably supported by the eccentric shaft, and a ring-shaped double-toothed gear provided on an outer circumference of the external-toothed gear. The shift range switching device includes internal teeth defined on an inner circumference of the double-toothed gear and engaged with external teeth of the external-toothed gear and the external-toothed gear defined on an outer circumference of the double-toothed gear and engaged with an output gear. The shift range switching device includes a restriction portion provided on one of the external-toothed gear and the fixing member and a restricted portion provided on the other of the external-toothed gear and the fixing member and engaged with the restriction portion.

8 Claims, 6 Drawing Sheets

(56) References Cited

U.S. PATENT DOCUMENTS

| | | | | |
|---|---|---|---|---|
| 3,443,378 A | * | 5/1969 | Goff | B62D 5/097 |
| | | | | 418/171 |
| 3,602,615 A | * | 8/1971 | Erwin | F16H 1/32 |
| | | | | 418/61.1 |
| 3,738,194 A | * | 6/1973 | Lorence | B62D 55/13 |
| | | | | 180/9.62 |
| 4,020,717 A | * | 5/1977 | Johnson | B60N 2/2252 |
| | | | | 297/362 |
| 2009/0058208 A1 | | 3/2009 | Kimura et al. | |
| 2010/0170355 A1 | | 7/2010 | Kume et al. | |
| 2013/0217531 A1 | | 8/2013 | Kume et al. | |

FOREIGN PATENT DOCUMENTS

| | | | | |
|---|---|---|---|---|
| JP | 2009-126005 A | | 6/2009 | |
| JP | 2012-222902 A | | 11/2012 | |
| JP | 2013-169125 A | | 8/2013 | |
| JP | EP 3098484 A1 * | | 11/2016 | F16H 61/32 |
| WO | 2014/051132 A1 | | 4/2014 | |

* cited by examiner

SHIFT RANGE SWITCHING DEVICE FOR VEHICLE

CROSS-REFERENCE TO RELATED APPLICATIONS

The present application claims priority under 35 U.S.C. §119 to Japanese Application No. 2015-110325 filed on May 29, 2015 the entire content of which is hereby incorporated herein by reference.

BACKGROUND OF THE INVENTION

1. Field of the Invention

The present invention relate to a shift range switching device for a vehicle including an electric motor.

2. Description of the Related Art

Typically, in an automatic transmission vehicle, including a Continuously Variable Transmission (CVT) and a Dual Clutch Transmission (DCT), switching a shift range to P (parking), R (reverse), N (neutral) and D (drive) is performed by a driver's operation of a shift lever. The shift lever operates a manual shaft via a shift cable to operate a manual valve of the transmission, so that oil passages of respective ranges are switched. Hydraulic equipment for such as P, R, N D or the like are respectively operated by switching the oil passages, and the vehicle is thus operated.

Recently, a SBW (Shift-By-Wire) method has been proposed as a technology in which a manual shaft is directly operated by an electric motor without using the shift cable described above. However, a large torque is required to release a parking lock. For generating such a large torque, there are methods of increasing power density of an electric motor, employing a speed reducer, etc. However, these methods result in size increases of the devices and therefore, in some instances, it may not be possible to dispose these devices in a vehicle mounting space.

For that reason, a reduction mechanism has been proposed, in which a large reduction ratio can be obtained in a relatively small size, by using an internal gear and an external gear which is engaged with an outer circumference the internal gear and by rotating either the internal gear or the external gear by means of the electric motor.

However, in the aforementioned reduction mechanism, the number of required gears may become increased, or a mechanism that rotates either the internal gear or the external gear may become complicated, so that it is difficult to make the reduction mechanism compact and to reduce the number of components. In particular, in a case when another gear or the like, which is provided separately from an internal-toothed gear and an external-toothed gear, is used and an output after being reduced is drawn out to the outside, the number of required components is increased and configurations can be further complicated. For that reason, with the shift range switching device of a vehicle using this type of reduction mechanism, it is difficult to simplify and miniaturize the device.

SUMMARY OF THE INVENTION

An exemplary preferred embodiment according to the present invention includes a shift range switching device of a vehicle, including an output gear which defines a driving source of shift range switching, an electric motor, an eccentric shaft which is provided in an output shaft of the electric motor, an external-toothed gear which is rotatably supported in the eccentric shaft, a ring-shaped double-toothed gear which is provided on an outer circumference of the external-toothed gear, internal teeth which are defined on an inner circumference of the double-toothed gear and engaged with external teeth of the external-toothed gear, external teeth which is defined on an outer circumference of the double-toothed gear and engaged with the output gear, a fixing member which is provided around the external-toothed gear, a restriction portion which is provided on any one side of the external-toothed gear and the fixing member, and a restricted portion which is provided on the other side of the external-toothed gear and the fixing member and is engaged with the restriction portion. The restriction portion and the restricted portion restrict rotation of the external-toothed gear with the external teeth of the external-toothed gear engaged with the internal teeth of the double-toothed gear. The external teeth of the external-toothed gear and the internal teeth of the double-toothed gear have different teeth numbers from each other to provide a predetermined reduction ratio.

The above and other elements, features, steps, characteristics and advantages of the present invention and preferred embodiments thereof will become more apparent from the following detailed description of the preferred embodiments with reference to the attached drawings.

DETAILED DESCRIPTION OF THE PREFERRED EMBODIMENTS

First Exemplary Preferred Embodiment

Figure 1:
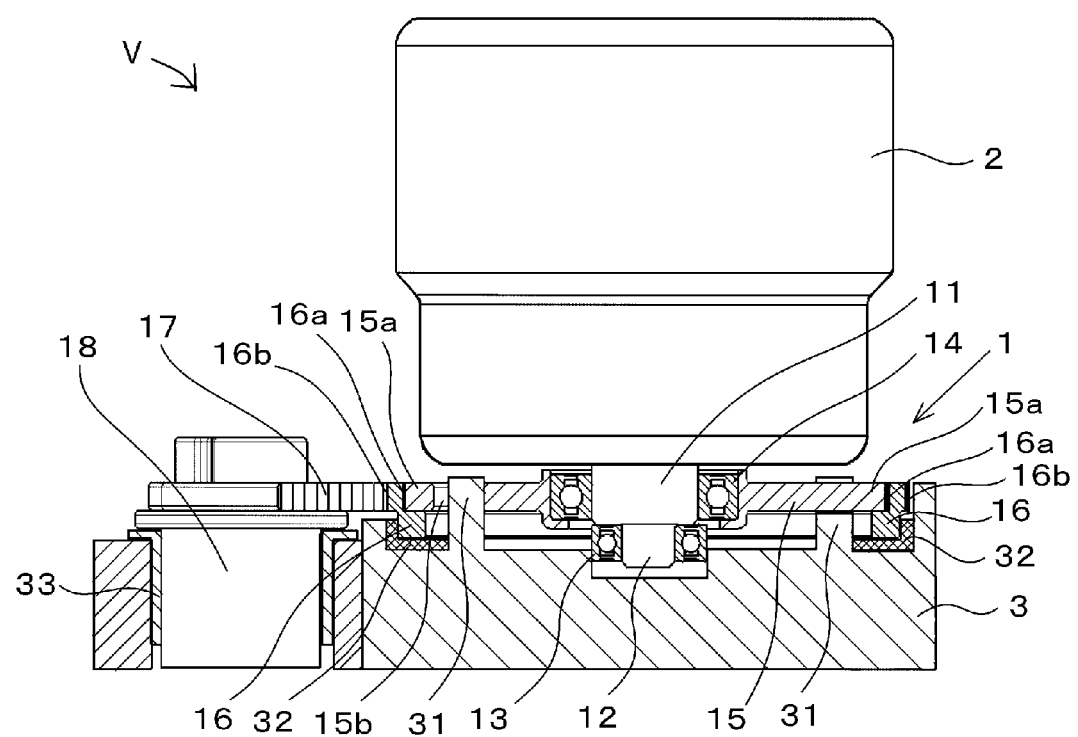
FIG. 1 is a vertical sectional view of a shift range switching device for a vehicle according to a first exemplary preferred embodiment of the present invention.

Hereinafter, examples of shift range switching devices for a vehicle according to various exemplary preferred embodiments of the present invention will be described with reference to the accompanying drawings. In the present specification, an upper side of FIG. 1 is simply referred to as "upper side" and a lower side thereof is simply referred to as "lower side" with respect to a direction of a rotation axis of an electric motor. Further, the upper and lower directions do not necessarily refer to positional relations or directions when the device is actually assembled and installed to any equipment. Furthermore, a direction (vertical direction of FIG. 1) parallel to the rotation axis of an electric motor is simply referred to as "axial direction", a radial direction having its center on the rotation axis of the electric motor is simply referred to as "radial direction", and a circumferential direction having its center on the rotation axis is simply referred to as "circumferential direction".

Figure 2:
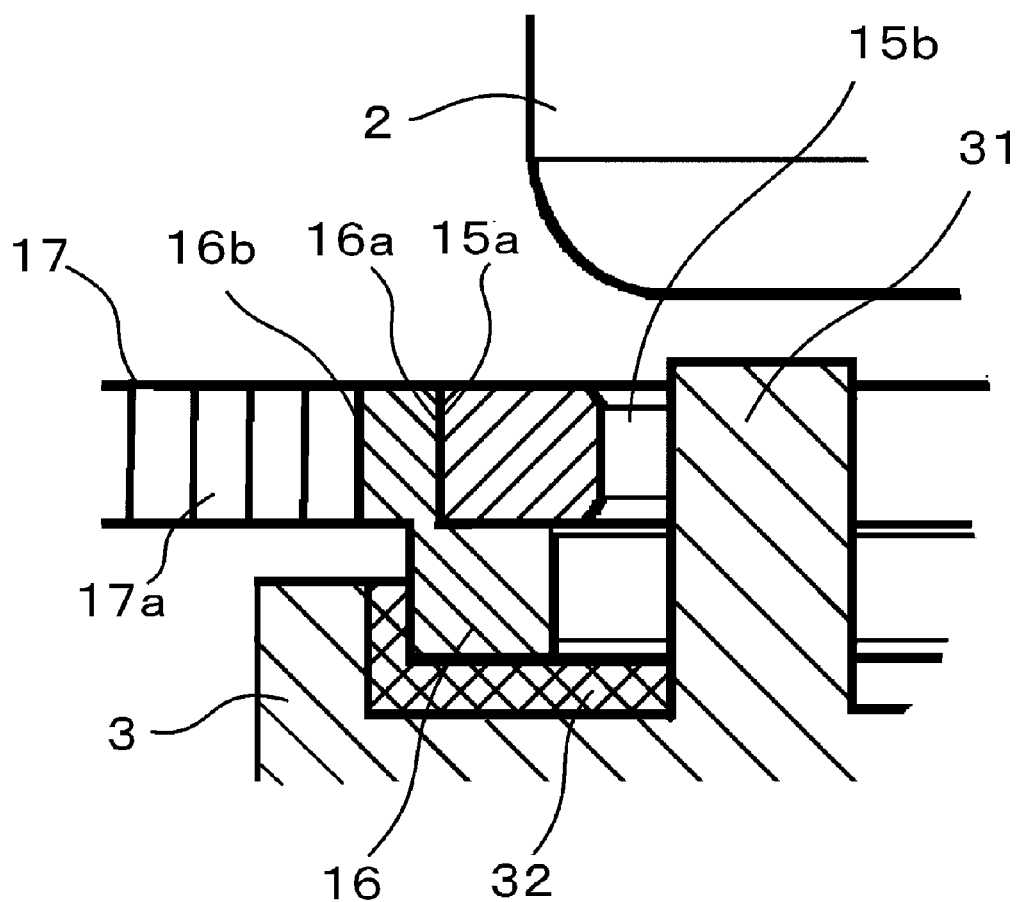
FIG. 2 is an enlarged vertical sectional view which illustrates the engagement of gears in the shift range switching device of the vehicle according to the first exemplary preferred embodiment of the present invention.
Figure 3:
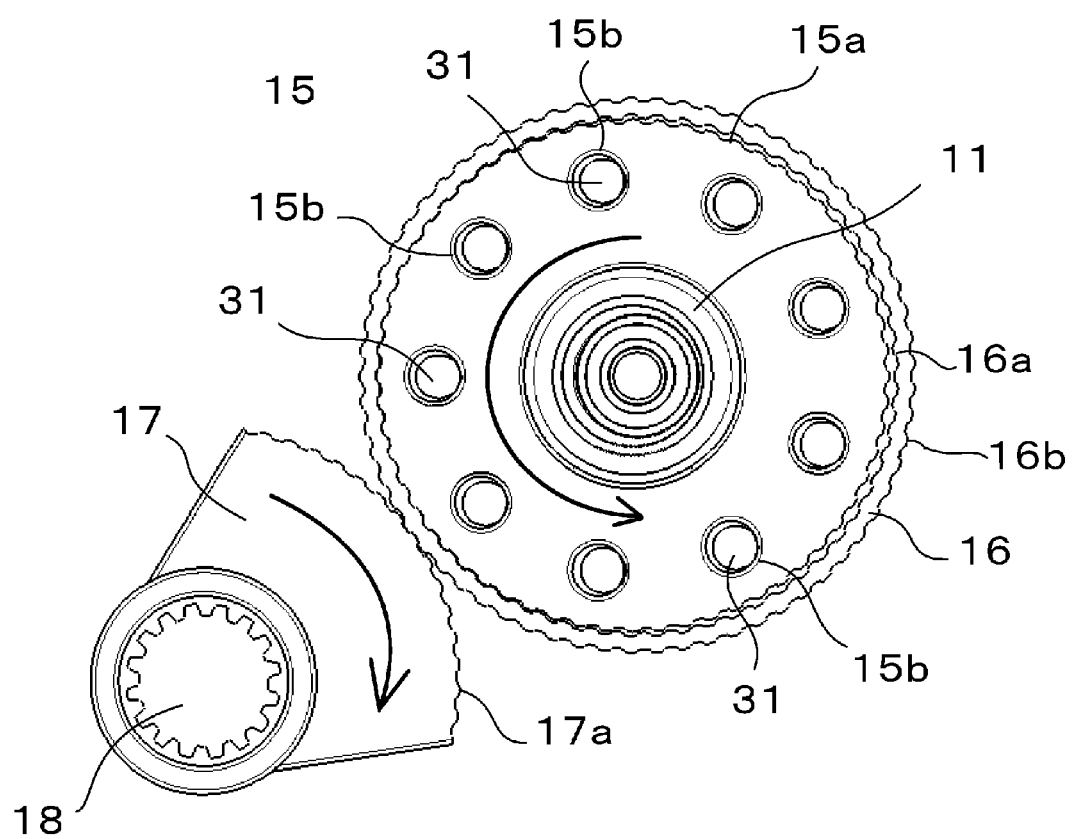
FIG. 3 is a horizontal sectional view which illustrates a reduction start state in the shift range switching device of the vehicle according to the first exemplary preferred embodiment of the present invention.

FIG. 1 is a vertical sectional view of a shift range switching device V for a vehicle according to the first exemplary preferred embodiment of the present invention. FIG. 2 is an enlarged vertical sectional view which illustrates the engagement of gears in the shift range switching device V of the vehicle according to the first exemplary preferred embodiment of the present invention. FIG. 3 is a horizontal sectional view which illustrates a reduction start state in the shift range switching device of the vehicle according to the first exemplary preferred embodiment of the present invention. As illustrated in FIG. 1, the shift range switching device V of the vehicle preferably includes a reduction mechanism 1, an electric motor 2, and a case 3. The case 3 is defined by a member fixed to the reduction mechanism 1. The electric motor 2 is preferably supported by a supporting member (not illustrated) such as a motor cover or the like.

The electric motor 2 has a rotation axis (not illustrated), an eccentric shaft 11 fixed to the rotation axis and a shaft end portion 12 provided on a tip of the eccentric shaft 11. The case 3 supports the shaft end portion 12 with a bearing 13. On an outer circumference of the eccentric shaft 11, an external-toothed gear 15 is rotatably supported via a bearing 14. In this exemplary preferred embodiment of the present invention, the bearings 13 and 14 are preferably ball bearings, for example. External teeth 15a are provided on an outer circumference of the external-toothed gear 15. Further, the bearings 13 and 14 may use different kinds of bearings other than the ball bearings.

As illustrated in FIG. 2 and FIG. 3, in the external-toothed gear 15, a plurality of circular holes 15b preferably are circumferentially provided at identical or substantially identical intervals and at radially equal or substantially equal distance positions from a center of the external-toothed gear 15, for example. In this exemplary preferred embodiment, the external-toothed gear 15 preferably includes nine circular holes 15b, for example. In the case 3, nine columnar supporting pins 31 are located at respectively corresponding positions to the circular holes 15b. Each of the supporting pins 31 is inserted into each of the circular holes 15b. An outer diameter of the supporting pin 31 is shorter than that of the circular hole 15b. A size difference between the outer diameter of the supporting pin 31 and an inner diameter of the circular hole 15b is preferably equal or substantially equal to a rotation size of the eccentric shaft 11 (that is, swingable distance of eccentric shaft 11). The supporting pin 31 preferably defines a restriction portion which restricts rotation of the external-toothed gear 15. The circular holes 15b preferably define restriction portions provided in the external-toothed gear 15 of which rotation is restricted by the supporting pins 31. The supporting pin 31 and the circular hole 15b preferably restrict a rotation range of the external-toothed gear 15 by the eccentric shaft 11 in a state when the external teeth 15a of the external-toothed gear 15 is engaged with internal teeth 16a of a double-toothed gear 16.

The ring-shaped or substantially ring-shaped double-toothed gear 16 is located on the outer circumference of the external-toothed gear 15. The internal teeth 16a which are engaged with the external teeth 15a of the external-toothed gear 15 are provided on an inner circumferential portion of the double-toothed gear 16. Different numbers of the external teeth 15a of the external-toothed gear 15 and the internal teeth 16a of the double-toothed gear 16 are provided to correspond to a predetermined reduction rate of the reduction mechanism 1. For example, a ratio of the number of the external teeth 15a and the number of the internal teeth 16a is preferably 60:61, 59:60 or the like. External teeth 16b engaged with an output gear, which will be described in detail in a subsequent section, are provided on an outer circumferential portion of the double-toothed gear 16.

The double-toothed gear 16 is a tube-shaped member as illustrated in FIG. 1 to FIG. 3. A size of the double-toothed gear 16 in the axial direction is shorter than that of the case 3. An inner diameter on an upper portion of the double-toothed gear 16 is longer than an inner diameter on a lower portion of the double-toothed gear 16. An outer diameter on the upper portion of the double-toothed gear 16 is larger than an outer diameter on the lower portion of the double-toothed gear 16. That is, a step is defined between the upper portion and the lower portion of the double-toothed gear 16. On an upper end portion of the double-toothed gear 16, the above-described internal teeth 16a and external teeth 16b are provided. On a lower end portion of the double-toothed gear 16 is supported by a ring-shaped slide bearing 32 provided in the case 3. The double-toothed gear 16 circumferentially rotates on the rotation axis of the electric motor 2.

As shown in FIG. 1, the case 3 is fixed to a bearing 33. An output shaft 18 is rotatably supported by the bearing 33. An output gear 17 is located in a vicinity of the double-toothed gear 16. More specifically, the output gear 17 is provided adjacent to a radially outer side of the double-toothed gear 16. In this exemplary preferred embodiment, the output gear 17 is preferably defined as a fan-shaped member, for example. In the output gear 17, a pivot of the fan shape is fixed to one end portion of the output shaft 18. The output shaft 18, for example, is preferably connected to a manual shaft of SBW or the like. As shown in FIG. 2 and FIG. 3, engaging teeth 17a, which are engaged with the external teeth 16b of the double-toothed gear 16, are provided on an edge portion of the fan shape of the output gear 17. As illustrated in FIG. 2, the external-toothed gear 15, the internal teeth 16a of the double-toothed gear 16 and the output gear 17 are located in the same plane. In other words, the external-toothed gear 15, the internal teeth 16a and the external teeth 16b of the double-toothed gear 16 and the output gear 17 are located at axially same positions.

In the present preferred embodiment, tooth shapes of the external teeth 15a of the external-toothed gear 15 and the internal teeth 16b of the double-toothed gear 16 are trochoid tooth shapes from which a portion is removed. That is, the tooth shape of the external teeth 15a and the tooth shape of the internal teeth 16b are so-called circulute shapes. The circulute tooth shape is a tooth shape in which circles having different diameters are simply and internally contacted to each other. In the circulute tooth shape, rigidity of a tooth bottom portion is high, a contact area between the engaging teeth is large and an in-plane pressure on the contact area is extremely small. For that reason, in a gear having the tooth in the circulute tooth shape, a long life and a transfer efficiency of about 90% or more, for example, is able to be obtained while a thickness of the gear is able to be thin.

When the electric motor 2 is operated, the rotation axis of the electric motor 2 rotates and the eccentric shaft 11 fixed to the rotation axis rotates. As described above, the external-toothed gear 15 is preferably attached to the eccentric shaft 11 via the bearing 13. However, since the supporting pin 31 provided in the case 3 is inserted in the circular hole 15b, the external-toothed gear 15 cannot rotate on the center axis of the external-toothed gear 15. As a result, when the eccentric shaft 11 rotates, the external-toothed gear 15 rotates in response to the rotation of the eccentric shaft 11.

Accordingly, when the eccentric shaft 11 rotates, the external teeth 15b of the external-toothed gear 15 are engaged with the internal teeth 16b of the double-toothed gear 16 while an inner circumferential surface of the circular hole 15b is slid and moved around the supporting pin 31, so that the external teeth 15a and the internal teeth 16a are engaged and repositioned along an inner circumference of the double-toothed gear 16. A preferred embodiment of the present invention which includes this arrangement can be seen in FIG. 3.

As described above, the number of the external teeth 15a of the external-toothed gear 15 is different from the number of the internal teeth 16a of the double-toothed gear 16. For that reason, when the external teeth 15a and the internal teeth 16a are engaged and repositioned and the external-toothed gear 15 is moved by one revolution along the inner circumference of the double-toothed gear 16, the double-toothed gear 16 rotates by the number difference. For example, if the number of the external teeth 15a is 60 and the number of the internal teeth 16a is 61, the eccentric shaft 11 rotates by sixty revolutions, the external-toothed gear 15 rotates by sixty revolutions and the double-toothed gear 16 rotates by one revolution. With this configuration, a reduction mechanism 1 decelerates the rotation inputted from the motor 2 to one sixtieth, and outputs it.

That is, the rotation of the external-toothed gear 15 is restricted by the supporting pin 31 and the circular hole 15b, but the double-toothed gear 16 engaged with the external-toothed gear 15 is rotatably supported by the ring-shaped slide bearing 32. For that reason, when the external-toothed gear 15 travels around an inner side of the double-toothed gear 16, the double-toothed gear 16 rotates on the slide bearing 32 by the number difference.

Figure 4:
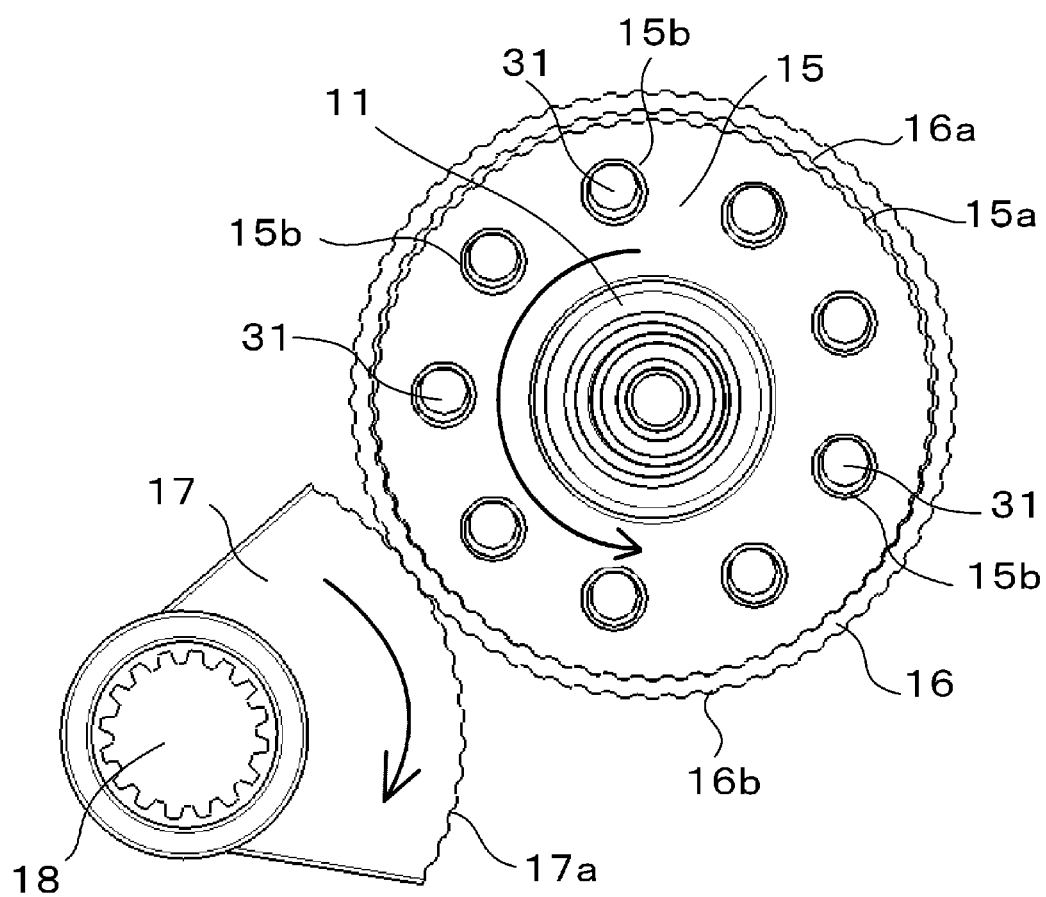
FIG. 4 is a horizontal sectional view which illustrates a reduction finish state in the shift range switching device of the vehicle according to the first exemplary preferred embodiment of the present invention.

When the double-toothed gear 16 rotates, a rotation power is transferred to the teeth 17a of the output gear 17, which are engaged with the external teeth 16b of the double-toothed gear 16. As a result, the output shaft 18 fixed to the double-toothed gear 17 rotates. Hereinafter, in the same method, the external-toothed gear 15 and the double-toothed gear 16 rotate along a reduction rate, which corresponds to the number of teeth, by rotating the electric motor 2, and the output gear 17 rotates by a certain angle. A preferred embodiment of the present invention which includes this arrangement can be seen in FIG. 4.

As described above, the double-toothed gear 16 is engaged with both of the external-toothed gear 15 on an input side and the output gear on an output side. For that reason, in the reduction mechanism 1, a gear engaged with the gear on the input side and a gear engaged with the gear on the output side do not need to be separately provided. That is, to engage one gear to the gear on the input side and the gear on the output side, the number of required components of the reduction mechanism 1 can be reduced.

In the reduction mechanism 1, the external-toothed gear 15, the double-toothed gear 16, and the output gear 17 are provided in the same plane to use the double-toothed gear 16. For that reason, the reduction mechanism 1 is able to be made thinner in the axial direction.

Further, since the respective gears are engaged in the same plane, the eccentric shaft 11 does not need to be supported by a plurality of bearings. That is, the eccentric shaft 11 can be supported with only one bearing (that is, bearing 14), and the number of using bearings is reduced in the reduction mechanism 1. As a result, the number of components of the reduction mechanism 1 is reduced and the reduction mechanism 1 is able you be made thinner.

As described above, the external teeth 15a of the external-toothed gear 15 and the internal teeth 16a of the double-toothed gear 16 can have the tooth shape such as the circulute tooth shape. For that reason, the rigidity of tooth bottom portions of the external teeth 15a and the internal teeth 16a is able to be improved, and thicknesses of the external-toothed gear 15 and the double-toothed gear 16 is able to be made thinner.

The supporting pin 31 is located in the case 3. The supporting pin 31 is the restriction portion which restricts the rotation of the external-toothed gear 15. Restriction portions or restricted portions other than the circular holes 15b of the external-toothed gear 15 do not need to be provided to the gear. For that reason, the configuration of the gear is able to be simplified and the gear is able to be made thinner.

Second Exemplary Preferred Embodiment

Figure 5:
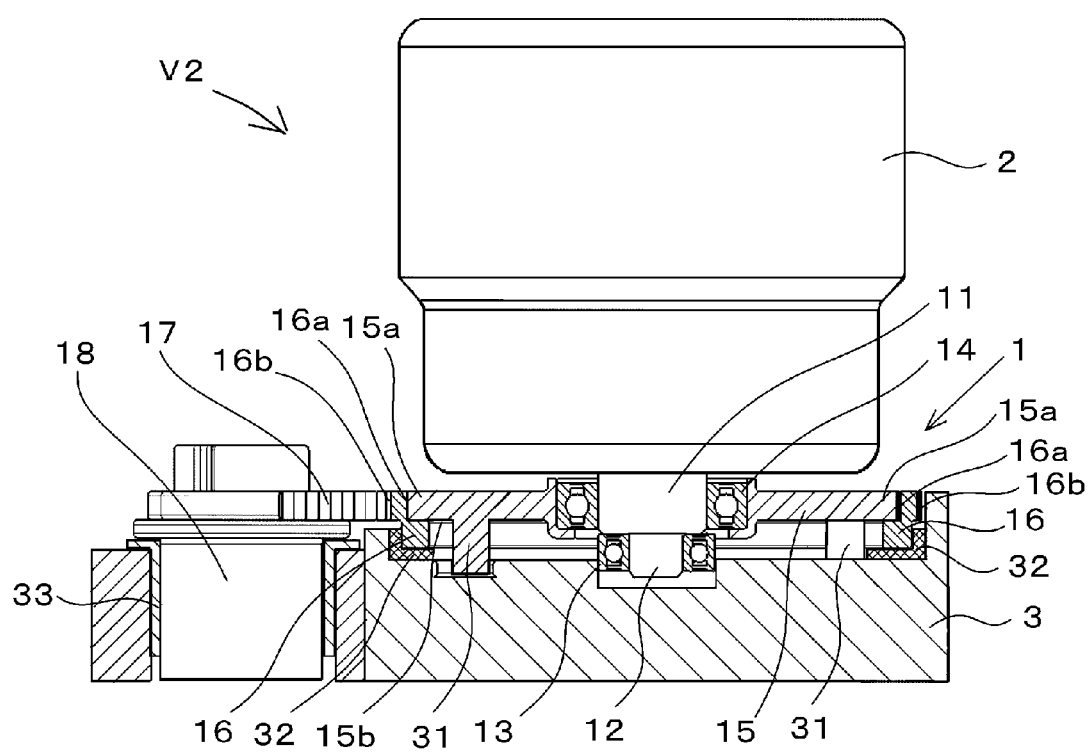
FIG. 5 is a vertical sectional view of a shift range switching device for a vehicle according to a second exemplary preferred embodiment of the present invention.

FIG. 5 is a diagram which illustrates a shift range switching device V2 for a vehicle according to the second exemplary preferred embodiment of the present invention. When compared to the first exemplary preferred embodiment of the present invention, the configuration of the restriction portion and the restricted is changed in the second exemplary preferred embodiment of the present invention. In this exemplary preferred embodiment, in the external-toothed gear 15, a supporting pin 15c is provided instead of the circular hole 15b. Meanwhile, a circular hole 34 in which the supporting pin 15c is inserted, is located on a side of the case 3. Description of sizes and positions of the supporting pin 15c and the circular hole 34 will be omitted since those are the same as the supporting pin 15c and the circular hole 15b in the first exemplary preferred embodiment of the present invention. With this configuration, the external-toothed gear 15 is able to rotate while being engaged with the internal teeth 16a of the double-toothed gear 16.

In this exemplary preferred embodiment of the present invention, the number of components of the reduction mechanism 1 is able to be reduced, the reduction mechanism is able to be made thinner, the configuration of the gear is able to be simplified and the gear is able to be made thinner as the same in the first exemplary preferred embodiment of the present invention. Further, in the second exemplary preferred embodiment of the present invention, the circular hole 15b is not provided in the external-toothed gear 15, which is different from the first exemplary preferred embodiment. For that reason, rigidity of the external-toothed gear 15 in the second exemplary preferred embodiment of the present invention is relatively higher than the rigidity of the external-toothed gear 15 in the second exemplary preferred embodiment of the present invention.

Third Exemplary Preferred Embodiment

Figure 6:
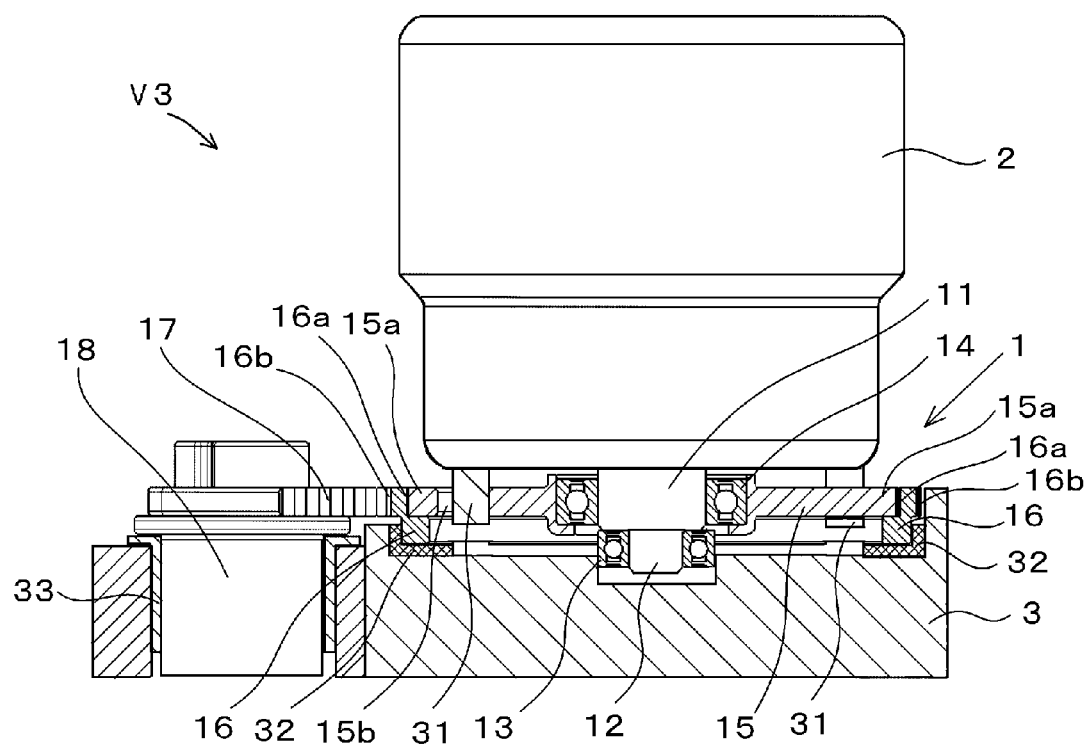
FIG. 6 is a vertical sectional view of a shift range switching device for a vehicle according to a third exemplary preferred embodiment of the present invention.

FIG. 6 is a diagram which illustrates a shift range switching device V3 for a vehicle according to the third exemplary preferred embodiment of the present invention. In the third exemplary preferred embodiment of the present invention, the restriction portion or the restricted portion is provided in a housing of the electric motor 2. The housing of the electric motor 2 is a fixing member which fixes the reduction mechanism 1. The supporting pin 31 is provided in the housing of the electric motor 2. The supporting pin 31 is inserted into the circular hole 15b of the external-toothed gear 15.

In this exemplary preferred embodiment, the number of components of the reduction mechanism 1 is able to be reduced, the reduction mechanism is able to be made thinner, the configuration of the gear is able to be simplified and the gear is able to be made thinner as the same in the first exemplary preferred embodiment. Especially, when the electric motor 2 and the external-toothed gear 15 are adjacent to each other in this exemplary preferred embodiment of the present invention, a height of the supporting pin 31 is able to be decreased and a height of the shift range switching device V3 of the vehicle is able to be reduced. As the same way, in the housing of the electric motor 2, by providing the slide bearing 32 of the double-toothed gear 16 and the bearing 33 of the output shaft 18, the structure is able to be practiced even when the case 2 and the reduction mechanism 1 are separated with a distance.

Other Exemplary Preferred Embodiments

The present disclosure is not limited to the above exemplary preferred embodiments of the present invention. The above exemplary preferred embodiments of the present invention are proposed as examples and other various aspects can be performed. They may be omitted, substituted and modified variously without departing the scope of the disclosure. These exemplary preferred embodiments and the modifications are included in the scope of the disclosure, the summary and the uniform scope thereof. Hereinafter, an example thereof will be described.

In the first exemplary preferred embodiment of the present invention, the electric motor 2 is supported by the supporting member, which is not illustrated in the drawings (for example, motor cover or the like). However, a tip of the supporting pin 15c may extend and the electric motor 2 may be supported by the supporting pin 15c. The number, the positions or the like of the restriction portions and the restricted portions are not limited thereto. The number of the restriction portions and the restricted portions may be larger or smaller than the above-described number.

In the external teeth 15a or the internal teeth 16a, other circular arc tooth shape than the circulute tooth shape may be used. In the external-toothed gear 15 and the double-toothed gear 16, other gear having tooth shape than the above-described gears may be used.

As the output gear 17, a circular gear may be used other than the fan-shaped gear. As the external teeth 16b and the teeth 17a, differently shaped teeth (for example, helical tooth (helical gear)) than the external teeth 15a and the internal teeth 16a may be used.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

While the description above refers to particular preferred embodiments of the present invention, it will be understood that many modifications may be made without departing from the spirit thereof. The accompanying claims are intended to cover such modifications as would fall within the true scope and spirit of the present disclosure.

The presently disclosed preferred embodiments are therefore to be considered in all respects as illustrative and not restrictive, the scope of the disclosure being indicated by the appended claims, rather than the foregoing description, and all changes which come within the meaning and range of equivalency of the claims are therefore intended to be embraced therein.

What is claimed is:

1. A shift range switching device of a vehicle, comprising:
   an output gear which defines a driving source of shift range switching;
   an electric motor and an eccentric shaft which is provided on an output shaft of the electric motor;
   an external-toothed gear which is rotatably supported by the eccentric shaft;
   a ring-shaped double-toothed gear which is provided on an outer circumference of the external-toothed gear;
   internal teeth which are defined on an inner circumference of the double-toothed gear and engaged with external teeth of the external-toothed gear;
   external teeth which are defined on an outer circumference of the double-toothed gear and engaged with the output gear;
   a fixing member which is located adjacent to the external-toothed gear;
   a restriction portion which is provided on one of the external-toothed gear and the fixing member; and
   a restricted portion which is provided on the other of the external-toothed gear and the fixing member and engaged with the restriction portion; wherein the restriction portion and the restricted portion restrict rotation of the external-toothed gear with the external teeth of the external-toothed gear engaged with the internal teeth of the double-toothed gear; and
   the external teeth of the external-toothed gear and the internal teeth of the double-toothed gear have different teeth numbers from each other in response to a reduction ratio.

2. The shift range switching device of the vehicle of claim 1, wherein the external-toothed gear, the double-toothed gear and the outer gear are located in a same plane.

3. The shift range switching device of the vehicle of claim 1, wherein the restriction portion is a round rod which is located in the fixing member, the restricted portion is a circular hole which is located in the external-toothed gear and a supporting pin is fitted into the circular hole.

4. The shift range switching device of the vehicle of claim 1, wherein the fixing member is a case of a reduction mechanism.

5. The shift range switching device of the vehicle of claim 1, wherein the fixing member is provided in the electric motor.

6. The shift range switching device of the vehicle of claim 1, wherein the output shaft of the electric motor is supported to the fixing member with a bearing.

7. The shift range switching device of the vehicle of claim 1, wherein, the double-toothed gear is supported by a slide bearing having a ring shape which is provided in the fixing member.

8. The shift range switching device of the vehicle of claim 1, wherein the external teeth of the external-toothed gear and the internal teeth of the double-toothed gear have an arc tooth shape or a tooth shape where a portion of a trochoid tooth shape is removed.

* * * * *